United States Patent [19]

Lennon

[11] Patent Number: 4,893,523
[45] Date of Patent: Jan. 16, 1990

[54] BICYCLE AND PEDAL SYSTEM

[76] Inventor: Dan C. Lennon, Box 1177, Hailey, Id. 83333

[21] Appl. No.: 142,049

[22] Filed: Jan. 7, 1988

[51] Int. Cl.[4] .............................................. G05G 1/14
[52] U.S. Cl. .................................... 74/594.6; 280/259
[58] Field of Search .................. 280/289 R, 291, 294, 280/210, 11.3, 11.31, 259; 74/560, 566, 594.1, 594.4, 594.5, 594.6; 36/131, 132

[56] References Cited

U.S. PATENT DOCUMENTS

| 598,325 | 2/1898 | McIntyre | 74/594.6 |
| 644,074 | 2/1900 | Hart | 280/294 |
| 2,998,260 | 8/1961 | Meyer | 280/11.3 |
| 4,298,210 | 11/1981 | Lotteau | 74/594.5 |
| 4,538,480 | 9/1985 | Trindle | 74/594.6 |
| 4,640,151 | 2/1987 | Howell | 74/594.6 |
| 4,735,107 | 4/1988 | Winkie | 74/594.6 |

FOREIGN PATENT DOCUMENTS

| 3315282 | 10/1984 | Fed. Rep. of Germany | 74/594.6 |
| 2279607 | 2/1976 | France . | |
| 2403757 | 5/1979 | France | 280/289 R |
| 2432427 | 4/1980 | France | 36/131 |
| 2577767 | 8/1986 | France | 36/131 |
| 2579555 | 10/1986 | France | 74/594.6 |

OTHER PUBLICATIONS

Ultrasport Magazine, Mar. 1986, inside cover and page immediately following thereof.
Bicycle Guide, Sep./Oct., 1986, p. 53.
Look Pedal Advertisement, p. 48, (publication and publication date unknown).

Primary Examiner—Charles A. Marmor
Assistant Examiner—Michael Mar
Attorney, Agent, or Firm—Jenner & Block

[57] ABSTRACT

A bicycle pedal system consisting of a flanged stud mountable to a bicycle rider's shoe, and a pedal, consisting of a shaft and a platform mounted thereto. The platform contains one or more slots for engaging the flanged stud, and a free zone which allows the rider to disengage the stud while still operating the pedal system. In another embodiment, a bicycle which contains the pedal system described above.

45 Claims, 3 Drawing Sheets

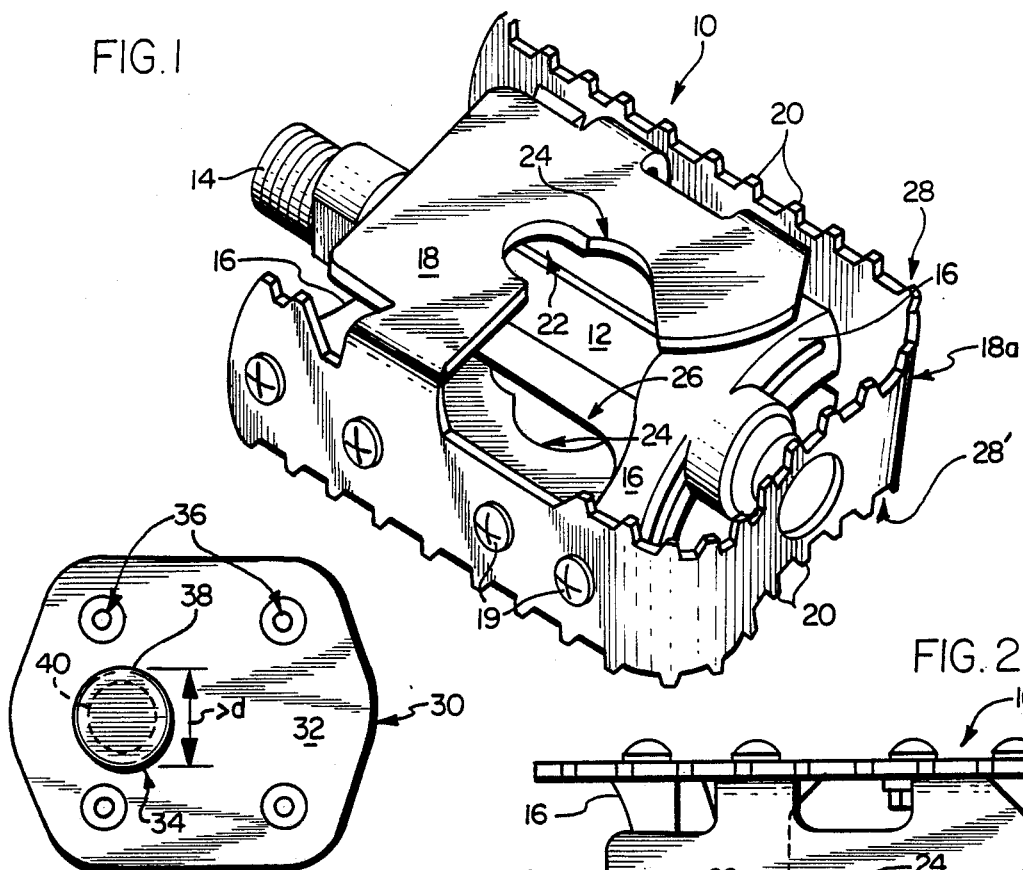
FIG. 1
FIG. 3
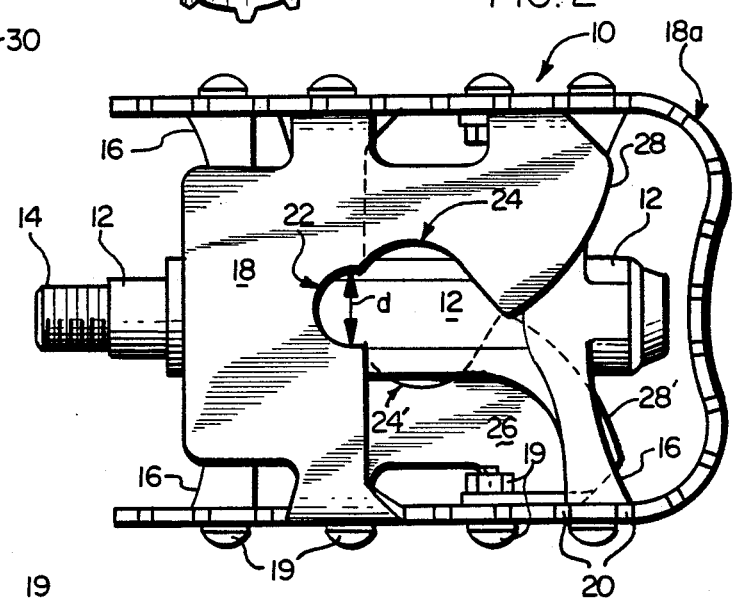
FIG. 2
FIG. 4
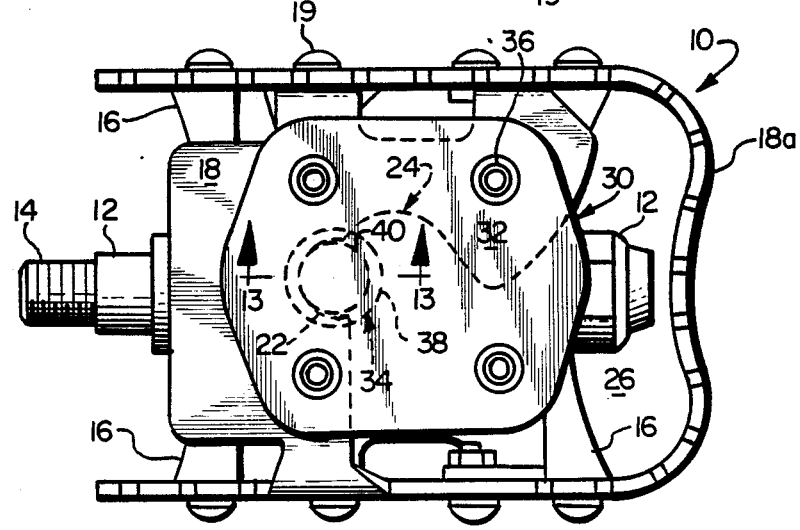

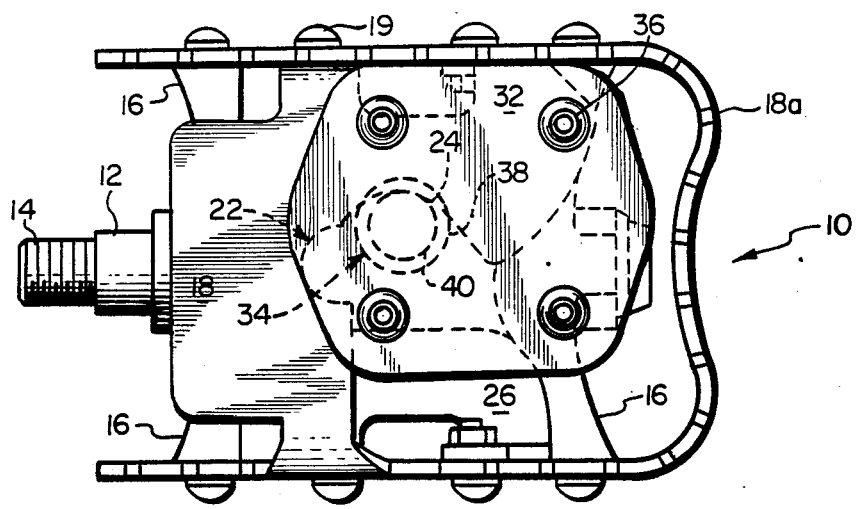
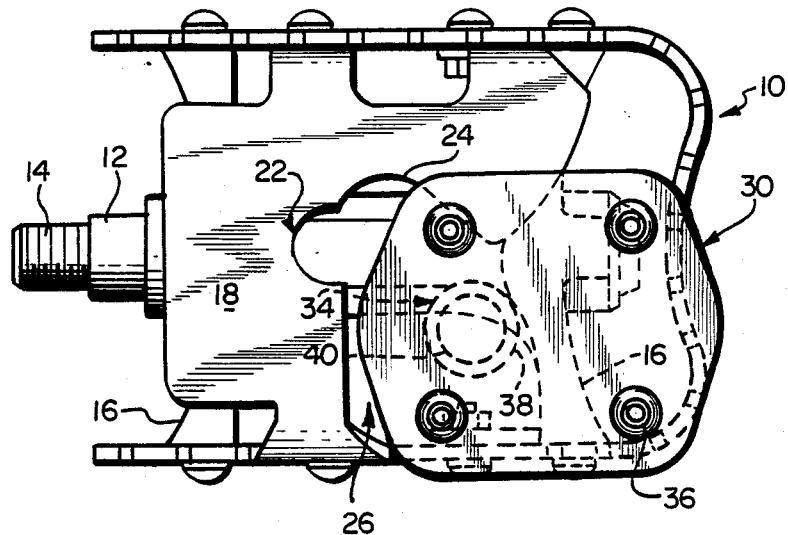
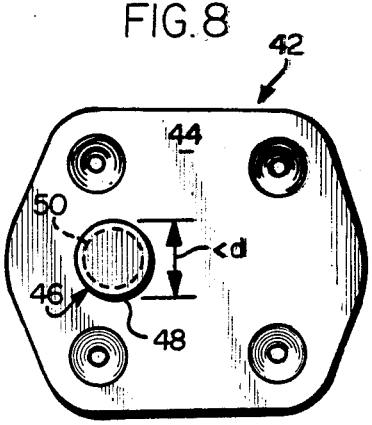
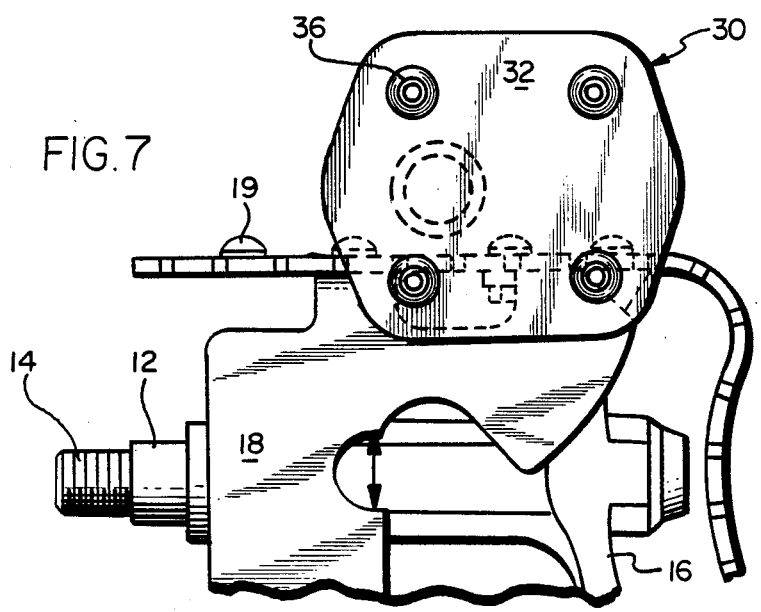

BICYCLE AND PEDAL SYSTEM

FIELD OF THE INVENTION

This invention relates to bicycles and pedal systems therefor that are adapted to improve the performance and stamina of the rider.

BACKGROUND OF THE INVENTION

The design of racing bicycles, or other special-purpose bicycles, is especially complex. Structural changes which may at first seem minor to the unskilled can provide significant improvement in bicycle performance. This improved performance can provide recognizable advantage to the bicycle rider.

The bicycle pedal is an important part of the bicycle, since it links the power of the rider to the bicycle. For effective performance, the rider's power must be efficiently transmitted to the bicycle while minimizing fatigue and strain of the rider and the anatomy of his body that is most closely associated with the transfer of power from the rider to the bicycle.

To perform well in bicycle race competition, where fast mounting and dismounting is important or in competition where effective power transfer and long-term endurance and comfort are important, an effective pedal system linking the rider to the bicycle is needed.

To effectively link the rider to the bicycle, it is desirable for the rider to transfer power to the bicycle during the entire pedal cycle or stroke. Thus, the rider should be able to transfer as much force as desired while pushing down as well as while pulling up. Accordingly, a need exists for a bicycle, and a bicycle pedal and system that is able to provide this performance. A need also exists for such a bicycle, pedal and system that: (1) is easy to use; (2) can be efficiently engaged with minimum effort by the rider, even while pedaling at a high rate of speed; (3) is fast and simple to disconnect, even while pedaling, for efficiency and safety; (4) can be effectively used as a standard type pedal if desired (such as if a rider chooses to use standard shoes without modification, for example); (5) can provide various levels or degrees of attachment of the rider's foot to the pedal; and (6) allow foot, ankle and leg swivel during the pedal stroke to reduce the strain on the ankle and knee.

SUMMARY OF THE INVENTION

In accordance with the present invention, novel bicycle and pedal systems are provided that improve the performance and the endurance of the rider. The invention allows a rapid, efficient and safe coupling of the rider's feet to the pedals, allowing the rider to transfer maximum power during the entire pedal stroke, including the upstroke. The invention provides many other advantages including: easy coupling and decoupling even during hard pedaling; different levels of coupling; the pedal is usable as a normal pedal; even during full coupling, the rider's shoe, foot, ankle and leg can swivel or rotate, thereby reducing strain on the knee and ankle.

In accordance with the invention, a bicycle pedal system is provided that includes a flanged stud mountable to a bicycle rider's shoe and a pedal that comprises a shaft mountable to a bicycle and a platform structure that is secured to the shaft for supporting the bicycle rider. The platform structure includes a slot for engaging the flanged stud to lock the rider's foot to the pedal so that during the entire pedal stroke the rider can continue to transmit force to the bicycle. The platform structure of the pedal system that contacts the sole of the rider's shoe is substantially flat so that the pedal system can be used without coupling the rider's foot to the pedal, thereby allowing use with normal shoes as with a conventional pedal. The pedal system desirably includes a plurality of upwardly extending teeth located along the perimeter of the platform structure for improving traction between the pedal and the rider's shoe.

The slot may comprise a semicircular or half-circle slot for engaging the flanged stud. The flange may be cylindrical or of any suitable desired shape and either larger in diameter than the diameter of the semicircular slot or smaller in diameter than the semicircular slot, as hereinafter described in detail.

Preferably, when the pedal is mounted on a bicycle, the slot extends inwardly toward the bicycle. Thus, the system can be engaged at any time, even during pedaling by inward lateral movement or by exerting inward pressure. The stud is disengageable by outward lateral movement or outward pressure applied by the rider which also can be done at any time, such as during pedaling or coasting, for example.

Preferably, the flange and stud are cylindrical and the stud is rotatable relative to the slot when engaged therein. Thus, the foot, ankle and leg are allowed to swivel or rotate during pedaling, thereby reducing strain on the ankle and knee.

In accordance with another embodiment of the invention, the platform includes structure by which only a front portion of the flange is engageable, thereby allowing faster dismounting and over a wider direction of movement.

The flanged stud can be temporarily or permanently mounted to a shoe. For example, the flanged stud can be rigidly mounted to a plate which is mountable to the outer sole of a bicycle rider's shoe.

In accordance with the invention, the bicycle pedal may be provided with or without the flanged stud.

In accordance with another embodiment of the invention, a bicycle is provided that includes a frame, a rear wheel rotatably mounted to the frame, a steering post journaled to the frame, a front fork attached to the steering post, a front wheel rotatably mounted to the fork, handlebars connected to the steering post, a saddle affixed to the frame at a predetermined position above the frame, a drive sprocket to supply power via a chain connected to one of the wheels, two cranks mounted to the drive sprocket and a pedal mounted to each crank, wherein each pedal comprises a shaft with one end rotatably mounted to one of the cranks and platform structure secured to each shaft for supporting a bicycle rider, the platform structure including a slot for engaging a flanged stud mountable to a bicycle rider's shoe.

In accordance with another embodiment of the invention, a bicycle is provided as previously described with a pair of flanged studs, each mountable or mounted to a bicycle rider's shoe.

BRIEF DESCRIPTION OF THE DRAWINGS

FIG. 1 is a perspective view of a bicycle pedal in accordance with the invention;

FIG. 2 is a plan view of the pedal of FIG. 1;

FIG. 3 is a plan view of the flanged stud portion of a bicycle pedal system in accordance with the invention;

FIG. 4 is a plan view of a bicycle pedal system of the invention with the flanged stud engaged with the pedal in the full power position;

FIG. 5 is a plan view of a bicycle pedal system of the invention with the flanged stud engaged with the pedal in the half engaged position;

FIG. 6 is a plan view of a bicycle pedal system of the invention with the flanged stud in the free zone or disengaged position;

FIG. 7 is a plan view of a bicycle pedal system of the invention with the flanged stud in the forward zone;

FIG. 8 is a plan view of another embodiment of the flanged stud of FIG. 3;

DETAILED DESCRIPTION OF THE INVENTION

Figure 9:
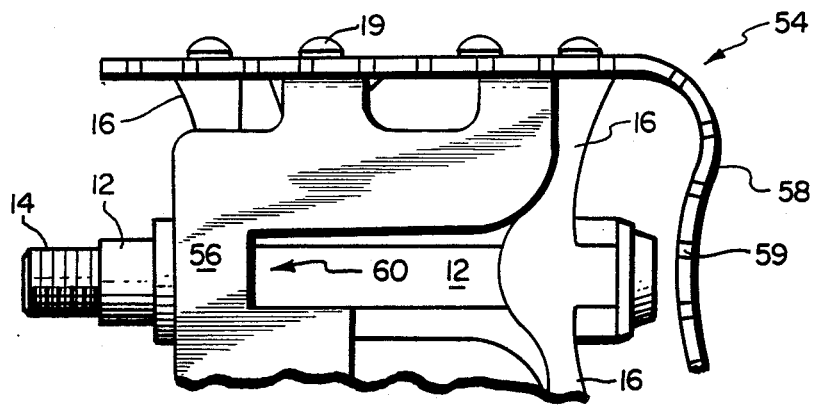
FIG. 9 is a partial plan view of another embodiment of a pedal in accordance with the invention.

Referring to the drawings generally and in particular to FIG. 1, there is illustrated in perspective view a bicycle pedal 10 in accordance with the invention which, in conjunction with shoe plate 30 of FIG. 3 comprise the pedal system. Bicycle pedal 10 includes a shaft 12 having a threaded member 14 rotatably mounted on shaft 12 for securing bicycle pedal 10 to a bicycle. Shaft 12 has mounted thereto a plurality of spokes 16, which may be integral to shaft 12, that facilitate mounting platform 18 to shaft 12. Platform 18 is mounted to spokes 16 with suitable nut and bolt assemblies 19.

Platform 18 includes a perimeter portion 18a that forms the outer vertical wall edges of platform 18. Perimeter or cage portion 18a has a plurality of dished teeth 20 located on the outer top and bottom perimeter of platform 18. Dished teeth 20 provide traction and shoe to pedal contact and feel.

Platform 18 defines a primary slot 22 that is utilized to couple or engage a rider's foot to bicycle pedal 10 as hereinafter described. Primary slot 22 is substantially a half-circle slot of diameter "d", as shown in FIG. 2.

Primary slot 22 extends from the outer portion of bicycle pedal 10 towards threaded member 14 or when mounted on a bicycle, towards the bicycle.

Platform 18 also defines a secondary slot 24 that is also useful in engaging a rider's shoe to bicycle pedal 10 as hereinafter described.

Platform 18 defines a free zone 26. Free zone 26 is an area that, allows bicycle pedal 10 to be utilized without any locking engagement of a rider's foot to bicycle pedal 10 when the system is being utilized.

Bicycle pedal 10 as shown in FIG. 1, and more particularly, as shown in FIG. 2, has symmetrical top and bottom shoe contact portions 28 and 28, respectively, so that either side can be utilized for contact with the rider's shoe.

FIG. 3 illustrates the remainder of the bicycle pedal system, a shoe plate 30. Shoe plate 30 includes a relatively flat mounting plate 32 and a flanged stud 34.

Figure 12:
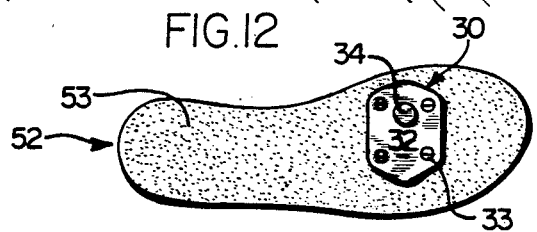
FIG. 12 is a bottom view of the shoe of FIG. 10.

Mounting plate 32 of shoe plate 30 has a plurality of beveled mounting holes 36 extending therethrough to facilitate attachment of shoe plate 30 to a shoe, such as by use of an appropriate threaded fastener 33 or other member, as shown in FIG. 12.

Figure 13:
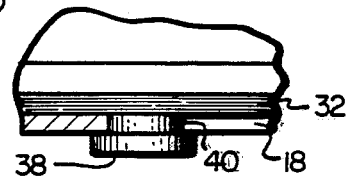
FIG. 13 is a partial sectional view illustrating a coupling position of the pedal system of the invention along lines 13—13 of FIG. 4.

As more clearly illustrated in FIG. 13, flanged stud 34 includes a cylindrical flange 38 located at the end of shank 40 of flanged stud 34. As shown in FIG. 13, shank 40, which is preferably circular in cross-section, is disposed within slot 22 with cylindrical flange 38 being located below the portion of platform 18 that defines slot 22. This positioning allows a rider to exert a full upward force during the pedal cycle while at the same time allowing rotation of flanged stud 34, thereby allowing rotation of the rider's foot, ankle and leg during the pedaling cycle. The length of shank 40 is greater than the thickness of slot 22 and platform 18 adjacent the locations where flange 38 couples or engages with pedal 10.

Cylindrical flange 38 has a larger diameter (>d as shown in FIG. 3) than the diameter of circular slot 22 and shank 40 has a smaller diameter or width than the diameter of slot 22 allowing it to be fully inserted therein.

FIGS. 4–7 illustrate various riding positions of the bicycle pedal system comprising bicycle pedal 10 and shoe member 30 during use.

In FIG. 4, flanged stud 34 is fully engaged within slot 22, which is the fully engaged or coupled position. In the fully coupled position, the rider can transmit the most power to the bicycle. The rider can push, pull, stand up, sit down, and pedal as hard as possible with full power, during the entire pedal stroke. The rider can change positions or decouple by moving flanged stud to the forward coupled position (FIG. 5), the free zone (FIG. 6) or forward of the pedal 10 (FIG. 7).

In FIG. 5, flanged stud 34 is frontally engaged within secondary slot 24. This allows the rider to pull up by lifting his toes in a manner similar to a half-clip, no-strap toe clip. This partial engagement or coupling is particularly useful when riding on terrain where falling off the bike is likely. The rider still has good pedal power yet can easily make a backward exit off the bike. Free zone 26 at the back of pedal 10 ensures that there is no restriction or hang-up upon exit.

In FIG. 6, flanged stud 34 is in the uncoupled or free zone position. When flanged stud 34 is in the free zone 26, the rider is not engaged to the pedals and is only able to push down to transmit motive force to the bicycle. The rider cannot pull up during the pedal cycle.

In FIG. 7, flanged stud 34 is positioned forward of bicycle pedal 10. By placing flanged stud 34 ahead of bicycle pedal 10, the rider pedals primarily with the arch of the foot, since flanged stud 34 is preferably located under the ball of the rider's foot, as shown in FIG. 12. In this forward position, there is no chance of the rider engaging or coupling flanged stud 34 to bicycle pedal 10, which in very technical (unridable) or very exposed trail sections is the best position to use.

In FIG. 8, an alternate embodiment of shoe plate 30 is illustrated as shoe plate 42. Shoe plate 42 includes a mounting plate 44 that is similar to mounting plate 32 previously described. Shoe plate 42 includes a flanged stud 46 that comprises a cylindrical flange 48 and a shank 50. Cylindrical flange 48 is dimensioned so that its diameter (<d as shown in FIG. 8) is slightly smaller than the diameter d of primary slot 22, and of course, shank 50 is smaller in diameter than cylindrical flange 48. Flanged stud 46 which is thus smaller than primary slot 22 is especially useful as an introductory step to learning the motor skills needed for riding with the pedal system of the present invention. There are four positions for flanged stud 46, as described with respect to flanged stud 34 in FIGS. 4–7. However, since the actual diameter of flanged stud 46 is smaller than the diameter of primary slot 22, so that when cylindrical flange 48 is properly aligned with primary slot 22 it will slide vertically out of the pedal while in the full engaged position. This allows the cyclist to apply a full downward force and most of the upward pull force during the pedal cycle but allows exit both laterally and vertically. Thus, flanged stud 46 allows the rider to release from the full coupled position by bowing the knee to the outside. Flanged stud 46 allows for approximately three-quarter pedal stroke power. The top one-quarter of the pull stroke is sacrificed for the advantage of easier decoupling from the fully coupled position.

The bicycle pedal system in accordance with the invention can be utilized as an original equipment system in which flanged stud 34 or 46 is permanently mounted to appropriate shoes or the system may be utilized as an aftermarket system. Preferably, the shoe to be utilized should have a sole that has a flat profile. It can have lugs or a traction pattern but should preferably have a flat sole to provide the desired shoe-pedal contact. The shoe should also have a relatively stiff sole. A relatively soft sole will absorb too much pedal effort and will not provide optimum support. Plastic insoles can be utilized to provide additional shoe stiffness. The insole should preferably extend from the toe back to the arch.

Figure 11:
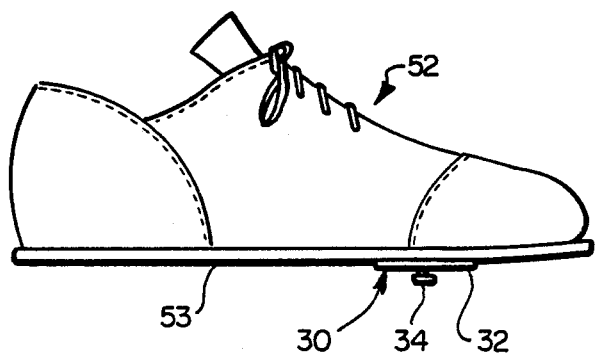
FIG. 11 is an elevation view of a bicycle shoe having a flanged stud in accordance with the invention.

FIGS. 11 and 12 illustrate a shoe 52 having stud member 30 mounted thereon. As illustrated in FIG. 11, mounting plate 32 remains flat on shoe 52 and is not bent around sole 53. Flanged stud 34 is located in position underneath the ball of the wearer's foot as illustrated in FIG. 12.

FIG. 9 illustrates another embodiment of a bicycle pedal 54 in accordance with the present invention. Bicycle pedal 54 is composed of elements that are similar to those of bicycle pedal 10 including shaft 12, threaded member 14 and spokes 16. A pedal platform 56 is provided that includes a perimeter or cage section 58 which may have upwardly extending teeth 59 as desired. Pedal platform 56 includes a rectangular slot 60 that can be used in a manner similar to primary slot 22 previously described. As will be understood by those skilled in the art, other changes, modifications and rearrangements of the invention will be suggested from this specification and such changes, modifications and rearrangements as fall within the scope of the appended claims are intended to be covered.

Figure 10:
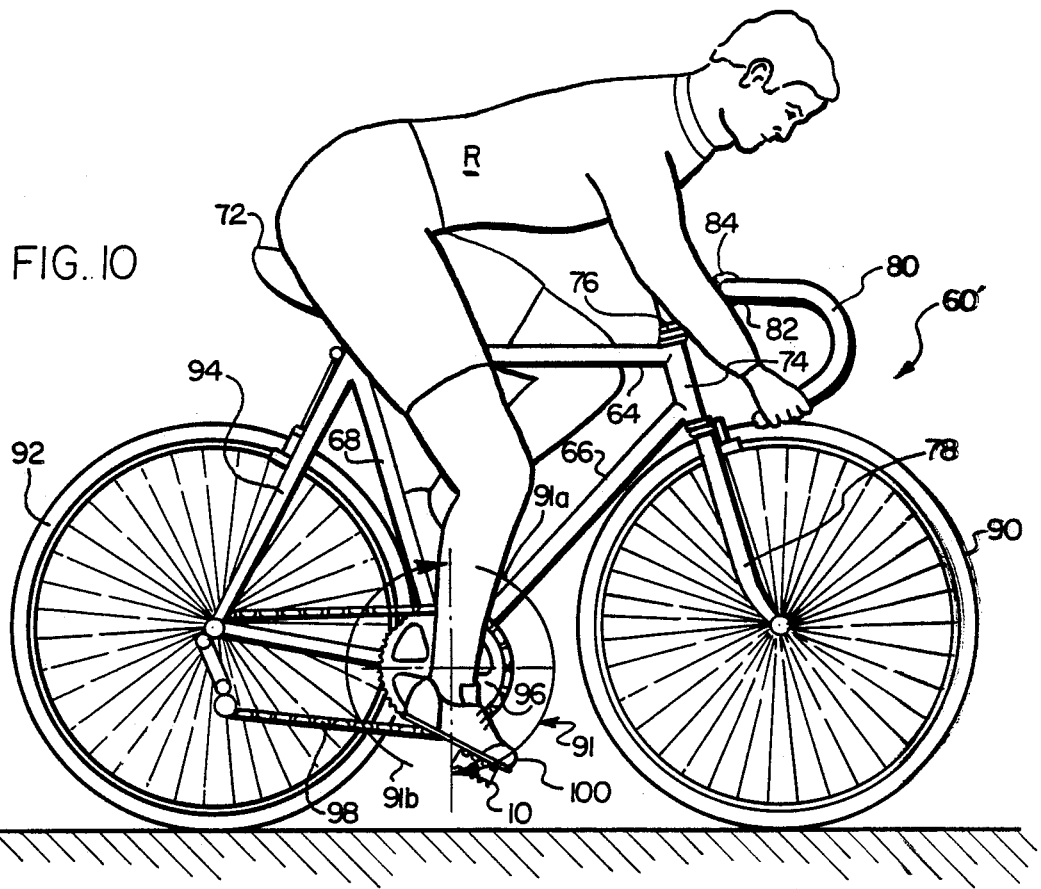
FIG. 10 illustrates a bicycle in accordance with the invention with a rider thereon.

FIG. 10 illustrates a bicycle 60 with a rider R thereon. Bicycle 60 includes a triangular-shaped frame comprised of a top tube 64, a down tube 66 and a seat tube 68. Extending from seat tube 68 is a seat post (not shown). Mounted atop the seat post is a saddle 72. The seat post may be raised or lowered into seat tube 68 to accommodate riders of different heights. Top tube 64 and down tube 66 extend forwardly to a fork or head tube 74. Journaled within fork tube 74 is a stem 76 leading to front forks 78. Handlebars 80 include a crosspiece 82 to which stem 76 is connected by a stem clamp 84. Brakes (not shown) are provided as known in the art and can be controlled in a known manner by brake levers. Front wheel 90 and rear wheel 92 are mounted to front fork 78 and rear fork 94, respectively.

Reference numeral 91 indicates the pedal cycle path followed by pedal 10, which includes a downstroke 91a and an upstroke 91b.

Bicycle pedal 10 is mounted to cranks (not to operate a drive sprocket 96 and a chain drive 98 in a known manner to propel the bicycle. The rider's shoe 100 is similar to shoe 52 of FIGS. 11 and 12 and includes a flanged stud coupled to bicycle pedal 10.

I claim:
1. A bicycle pedal system comprising:
   a flanged stud mountable to a bicycle rider's shoe to depend from the rider's shoe, said flange forming an enlarged lowermost portion of the stud;
   a pedal having a perimeter portion and comprising:
      a shaft mountable to a bicycle; and platform means secured to said shaft for supporting a bicycle rider, said platform means including a slot for engaging the flange of said stud and for restraining said stud from movement with respect to said platform means while allowing said stud to rotate when restrained by said slot, said platform means further including a free zone defined by an opening between said slot and the perimeter of said pedal in which said stud may be disposed in a disengaged position in said free zone by movement of said stud from said slot during pedaling, said free zone extending from said slot through the perimeter of the platform means, whereby the pedal system can be utilized in an engaged or disengaged position by the bicycle rider.

2. The pedal system of claim 1 wherein said platform means is substantially flat to allow use with normal shoes.

3. The pedal system of claim 2 further comprising a plurality of upwardly extending teeth along the perimeter of said platform means for improving traction.

4. The pedal system of claim 1 wherein said slot comprises a semicircular slot for engaging said flanged stud.

5. The pedal system of claim 4 wherein said flange is circular and is larger in diameter than the diameter of said semicircular slot.

6. The pedal system of claim 4 wherein said flange is circular and is smaller in diameter than the diameter of said semicircular slot.

7. The pedal system of claim 1 wherein when said pedal is mounted on a bicycle, said slot extends inwardly toward the bicycle.

8. The pedal system of claim 5 wherein said slot extends inwardly toward the bicycle and said stud is engaged in said slot by lateral movement of said stud in a direction towards the bicycle.

9. The pedal system of claim 8 wherein when said stud is engaged in said slot a bicycle rider's full upward force can be applied to the pedal.

10. The pedal system of claim 9 wherein said stud is disengageable by lateral movement of said stud in a direction away from the bicycle.

11. The pedal system of claim 4 wherein said platform means includes structure for engaging only a front portion of said flange.

12. The pedal system of claim 1 wherein the perimeter of said pedal includes a recessed area along a top portion of said pedal through which said stud can pass from said free zone when the rider's shoe, having the stud mounted thereto, is on the pedal by movement of said stud in a direction toward said recess during operation of the pedal system.

13. The pedal system of claim 1 comprising a pair of pedals and a pair of studs.

14. The pedal system of claim 1 wherein said stud is rigidly mounted to a plate, said plate being mountable to the outer sole of a bicycle rider's shoe.

15. The bicycle pedal system of claim 1 wherein said free zone extends rearwardly from said slot toward the perimeter of said pedal.

16. The bicycle pedal system of claim 1 wherein stud has a cylindrical flange and said free zone is substantially larger than the diameter of said cylindrical flange.

17. The bicycle pedal system of claim 1 wherein said slot is a half-circle slot and said platform means further includes a secondary slot separate from said half-circle slot, said secondary slot permitting partial engagement along the front of said flanged stud.

18. A bicycle pedal comprising:
a shaft with one end adapted for mounting to a bicycle; and
platform means secured to said shaft for supporting a bicycle rider and defining a perimeter of said pedal, said platform means including a slot for engaging the flange of a flanged stud mountable to a bicycle rider's shoe and for restraining the stud from movement with respect to said platform means while allowing the stud to rotate when restrained by said slot, said platform further including a free zone defined by an opening between said slot and the perimeter of said pedal in which the stud may be disposed in a disengaged position by movement of said stud from said slot and into said free zone during pedaling, said free zone extending from said slot through the perimeter of the platform means, whereby the pedal can be utilized in an engaged or disengaged position by the bicycle rider.

19. The pedal of claim 18 wherein said platform means is substantially flat to allow use with normal shoes.

20. The pedal of claim 19 further comprising a plurality of upwardly extending teeth along the perimeter of said platform means for improving traction.

21. The pedal of claim 18 wherein said slot comprises a semicircular slot for engaging a flanged stud.

22. The pedal of claim 21 wherein said flange is circular and is larger in diameter than the diameter of said semicircular slot.

23. The pedal of claim 21 wherein said flange is circular and is smaller in diameter than the diameter of said semicircular slot.

24. The pedal of claim 18 wherein said slot extends parallel to said shaft in a direction towards the end adapted for mounting to a bicycle.

25. The pedal of claim 22 wherein said slot in said slot by lateral movement of said stud in a direction towards the end of the shaft adapted for mounting to a bicycle.

26. The pedal system of claim 18 wherein the perimeter of said pedal includes a recessed area along a top portion of said pedal through which said stud can pass from said free zone when mounted to a rider's shoe located on the pedal by movement of said stud in a direction toward said recess during operation of the pedal system.

27. A bicycle, including a pedal system, comprising:
a frame;
a rear wheel rotatably mounted to the frame;
a steering post journaled to the frame;
a front fork attached to the steering post;
a front wheel rotatably mounted to the fork;
handlebars connected to the steering post;
a saddle affixed to the frame at a predetermined position above the frame;
a drive sprocket to supply power via a chain connected to one of the wheels;
a flanged stud mountable to a bicycle rider's shoe to depend from the rider's shoe, said flange forming an enlarged lowermost portion of the stud;
a pedal mounted to each crank, each pedal having a perimeter portion and comprising a shaft with one end rotatably mounted to one of said cranks, platform means secured to said shaft for supporting a bicycle rider, said platform means including a slot for engaging the flanged stud by the flange of the stud for restraining the stud from movement with respect to said platform means while allowing said stud to rotate when restrained by said slot, said platform means further including a free zone defined by an opening between said slot in the perimeter of said pedal in which the stud may be disposed in a disengaged position by movement from said slot during pedaling, said free zone extending from said slot through the perimeter of said platform means, whereby each pedal can be utilized in an engaged or disengaged position by the bicycle rider.

28. The bicycle of claim 27 wherein said platform means is substantially flat to allow use with normal shoes.

29. The bicycle of claim 26 further comprising a plurality of upwardly extending teeth along the perimeter of said platform means for improving traction.

30. The bicycle of claim 27 wherein said comprises a semicircular slot for engaging a flanged stud.

31. The bicycle of claim 28 wherein said flange is circular and is larger in diameter than the diameter of said semicircular slot.

32. The bicycle of claim 30 wherein said flange is circular and is smaller in diameter than the diameter of said semicircular slot.

33. The bicycle of claim 27 wherein said slot on each of said pedals extends inwardly towards the bicycle.

34. The bicycle of claim 31 wherein said slot extends inwardly toward the bicycle and said stud is engaged in said slot by lateral movement of said stud in a direction towards the bicycle.

35. The bicycle of claim 34 wherein when said stud is engaged in said slot a bicycle rider's full upward force can be applied to the pedal.

36. The bicycle of claim 35 wherein said stud is disengageable by lateral movement of said stud in a direction away from the bicycle.

37. The bicycle of claim 27 wherein said stud is rotatable when engaged in said slot.

38. The bicycle of claim 36 wherein said platform means includes structure for engaging only a front portion of said flange.

39. The bicycle of claim 27 wherein the perimeter of said pedal includes a recessed area along the top portion of said pedal through which said stud can pass from said free zone when the rider is supported by said pedal by movement of said stud in a direction toward said recess during operation of the pedal system.

40. The bicycle of claim 27 wherein in said stud is rigidly mounted to a plate, said plate being mountable to the outer sole of a bicycle rider's shoe.

41. A bicycle comprising:
a frame;
a rear wheel rotatably mounted to the frame;

a steering post journaled to the frame;
a front fork attached to the steering post;
a front wheel rotatably mounted to the fork; handlebars connected to the steering post;
a saddle affixed to the frame at a predetermined position above the frame;
a drive sprocket to supply power via a chain connected to one of the wheels;
two cranks mounted to the drive sprocket; and
a pedal mounted to each crank, each pedal having a perimeter portion and comprising a shaft with one end rotatably mounted to one of said cranks, platform means secured to said shaft for supporting a bicycle rider, said platform means including a slot for engaging a flanged stud by the flange of the stud for restraining the stud from vertical movement with respect to said platform means while allowing the stud to rotate, the flanged stud being mountable to a bicycle rider's shoe, said platform further including a free zone defined by an opening between said slot and the perimeter of said pedal in which said stud may be disposed in a disengaged position by movement of said stud from said slot and into said free zone during pedaling, said free zone extending from said slot through the perimeter of said platform means, whereby each pedal can be utilized in an engaged or disengaged position by the bicycle rider.

42. The bicycle of claim 41 wherein said platform means is substantially flat to allow use with normal shoes.

43. The bicycle of claim 42 further comprising a plurality of upwardly extending teeth along the perimeter of said platform means for improving traction.

44. The bicycle of claim 41 wherein said slot comprises a semicircular slot for engaging a flanged stud.

45. The bicycle of claim 44 wherein said flange is circular and is larger in diameter than the diameter of said semicircular slot.

* * * * *